(12) United States Patent
Mosser et al.

(10) Patent No.: US 6,171,704 B1
(45) Date of Patent: Jan. 9, 2001

(54) COATING FOR AEROSPACE ALUMINUM PARTS

(75) Inventors: Mark F. Mosser, Perkiomenville; James H. Greaser, Pottstown, both of PA (US)

(73) Assignee: Sermatech International, Inc., Limerick, PA (US)

( * ) Notice: Under 35 U.S.C. 154(b), the term of this patent shall be extended for 0 days.

(21) Appl. No.: 08/580,562

(22) Filed: Dec. 29, 1995

(51) Int. Cl.[7] .................. B32B 15/08; B32B 15/20; B64C 1/00; B23P 6/04
(52) U.S. Cl. .................. 428/450; 428/447; 428/457; 428/650; 428/654; 428/704; 428/687; 428/626; 428/36.91; 244/126; 244/133
(58) Field of Search .................. 428/650, 654, 428/457, 687, 447, 450, 469, 472.2, 689, 704, 615, 621, 622, 626, 632, 36.9, 36.91, 328, 331, 472.1, 446, 448; 148/253, 255, 257; 106/1.25, 14.12, 14.21, 286.5; 244/126, 133

(56) References Cited

U.S. PATENT DOCUMENTS

| | | | |
|---|---|---|---|
| 3,248,249 | * 4/1966 | Collins | 106/286 |
| 3,248,250 | * 4/1966 | Collins | 106/286 |
| 3,248,251 | * 4/1966 | Allen | 106/286 |
| 3,395,027 | * 7/1968 | Klotz et al. | 106/1 |
| 4,319,924 | * 3/1982 | Collins et al. | 106/14.12 |
| 4,381,323 | 4/1983 | Lowe et al. | 427/383.7 |
| 4,457,971 | * 7/1984 | Caldwell et al. | 428/323 |
| 4,537,632 | * 8/1985 | Mosser | 106/14.12 |
| 4,606,967 | * 8/1986 | Mosser | 428/220 |
| 4,617,056 | * 10/1986 | Mosser et al. | 106/1.12 |
| 4,895,608 | * 1/1990 | Bibber | 428/427.2 |
| 4,975,330 | * 12/1990 | Mosser | 428/472.1 |
| 5,242,488 | 9/1993 | Stetson et al. | 106/14.12 |
| 5,478,413 | 12/1995 | Mosser et al. | 148/261 |
| 5,536,686 | * 7/1996 | Chung | 501/111 |

FOREIGN PATENT DOCUMENTS

| | | |
|---|---|---|
| 1 813 480 | 2/1971 | (DE) . |
| 0 147 279 | 7/1985 | (EP) . |
| 0 150 650 | 8/1995 | (EP) . |
| 2 278 122 | 11/1994 | (GB) . |

OTHER PUBLICATIONS

R.B.C. Cayless, Alcan Rolled Products Company, "Alloy and Temper Designation Systems for Aluminum and Aluminum Alloys", *ASM Handbook* vol. 2, Properties and Selection:Nonferrous Alloys and Special–Purpose Materials, 1990. (No Month).

* cited by examiner

Primary Examiner—Deborah Jones
Assistant Examiner—Michael LaVilla
(74) Attorney, Agent, or Firm—Seidel, Gonda, Lavorgna & Monaco, PC

(57) ABSTRACT

A coated aerospace aluminum alloy part, such as a lipskin of a nacelle or a leading edge of a wing or tail, is disclosed which part is protected from corrosion due to severe environmental stresses, including high and low temperatures, and rain drop erosion, by a multilayer coating comprising a phosphate bonded metal containing basecoat and a resin based topcoat. A method of coating the part is disclosed.

15 Claims, 2 Drawing Sheets

COATING FOR AEROSPACE ALUMINUM PARTS

FIELD OF THE INVENTION

This invention relates to protecting aluminum parts from environmental stress. More particularly, this invention relates to coatings for protecting aerospace grade aluminum alloy parts from the effects of high temperature, high salt concentration, water droplet erosion, and other environmental stresses which aluminum aircraft parts are subjected to. The invention is especially suitable for the protection of aircraft parts exposed to high temperatures and water droplet erosion, such as lipskins of nacelles for jet engines and leading edges of wings and tails. The coatings of the invention are easily repairable and retouchable to maintain or restore a physical and aerodynamic virtually new condition and a virtually perfect cosmetic appearance.

"Aircraft" in this specification refers to both fixed wing and non-fixed wing aircraft, such as propeller driven airplanes, jets, and helicopters. When the term "aircraft" or "airplane" is used in this specification in conjunction with a nacelle or a lipskin, or when the term "nacelle" or "lipskin" is used in the specification, it relates to any device in which a nacelle housing for a jet engine is attached, which device may be a device for travelling in air, or may be a jet propelled device for travelling in water, a watercraft, or for travelling on land, a landcraft.

"Leading edge" or "leading edge of wings" in this specification refers to any leading horizontal or vertical membrane on the exterior of an aircraft, including the leading edges of wings and the horizontal and vertical leading edges of tails.

"Cosmetic repairability", in this specification refers to repair of a damaged area of an aluminum alloy part so that the repaired area is virtually indistinguishable by unaided visual inspection at a distance of 3 meters from an adjacent non-damaged area of the part.

"Repairability", in this specification refers to repair or restoration of a damaged area of an aluminum alloy part so that the repaired area is restored to, i.e., be virtually equivalent to, from the mechanical and physical point of view, to an undamaged adjacent or non-adjacent area of the part. Another way of expressing this feature is to describe the part as being "aerodynamically" restored to its like-new condition.

BACKGROUND

A "nacelle" is the housing over the jet engine with the forward part being a "nose cowl" made of a composite material attached to an aluminum alloy air inlet ring, which is called a "lipskin". See FIG. 1.

Lipskin rings may be up to about 3.66 meters (12 feet) in diameter. Because of the size, weight, and being attached to a composite structure, during the set up, hundreds of rivet holes are drilled and countersunk through the lipskin. During these procedures, the lipskins are invariably scratched, gouged, nicked, or otherwise damaged.

In operation, lipskins and leading edges of wings and tails are subjected to severe environmental exposure, which causes corrosion of these parts. The temperature in flight may vary from a low of −55° C. to a high of 60° C. Also, these parts are subjected to high velocity impact of dirt and runway debris. In flight, water droplet erosion adversely affects the lipskin and the leading edges. Additionally, these parts are subjected to temperatures of 190° C. (375° F.) or higher, up to 232° C. (450° F.), during deicing.

Thus, these leading edges are exposed to a unique combination of severe environmental conditions.

Aerospace aluminum alloys used in lipskins and leading edges are generally of the 2XXX series and contain copper, which provides strength when heat treated. Most members of the 2XXX series and other aerospace aluminum alloys, such as the 6XXX and 7XXX series, soften when exposed to temperatures used to deice a plane (between 121° C. (250° F.) and 190° C. (375° F.)). Temperatures of up to 232° C. (450° F.) may be used for deicing in an emergency situation.

The most common aluminum-copper alloy used for aerospace applications is AA2024, which has 4.4% copper, 1.5% magnesium, 0.6% manganese, and the remainder aluminum. AA2024 is commonly used in the leading edges of aircraft wings and the tail assembly. Leading edges are generally composed of multiple "C" shaped aluminum pieces about 8 inches across and 7–8 feet long. The leading edge may be attached by bolts or riveted to the body of the wing or tail. Leading edges are exposed to high temperatures during deicing, which causes softening of the alloy. However, such softening is generally not critical because the leading edge is not a structural member and, unlike the lipskin, is not a large self-supporting structure attached to a composite structure. The leading edges are subject to corrosion from high temperatures (deicing) and salt fog exposure and to erosion from water droplets from rain, or sleet, for example. Often, the leading edges are clad with Al 1100, pure aluminum, which does not corrode but is very soft. Because of its softness, Al 1100 scratches easily and cannot be repaired cosmetically. The rivets are ground to be flush with the clad aluminum leading edge, with great care being necessary to ensure that the thin cladding, usually about 100 μm (0.004 inches) thick, is not removed in the grinding process. It requires frequent maintenance, such as frequent polishing to maintain a cosmetic appearance. Polishing, however, is very labor intensive, especially due to the presence of large numbers of rivets, and does not repair scratches cosmetically.

Because AA2219 is heat tolerant (will not lose strength) at temperatures of up to 232° C. (450° F.), it is the most common alloy used in lipskins of nacelles. AA2219 has 6.3% copper, 0.30% manganese, 0.34% of total of vanadium, zirconium, and titanium, and the remainder aluminum. In older jet powered air craft, lipskins were made from sections of clad aluminum alloys joined together to form a ring, which offered some protection from corrosive environmental stresses. In modern manufacture of lipskins, the lipskins are made from one piece or from 2 or more partial-circular pieces. Because of the extreme deep drawing forming stresses these one or two piece lipskins cannot be formed from clad alloys.

The present state of the art method to protect lipskins is by anodizing by sulfuric acid per MIL-A-8625, followed by sealing in boiling water or other sealant to produce a clear or aluminum finish. Generally, following anodizing, lipskins are left unpainted due to the erosion from temperature extremes experienced by the lipskins and to the difficulty in cosmetically repairing the painted surface.

Anodizing protects the lipskin from corrosion, but only for a short time. The anodic coating is very thin and does not have a long erosion life, usually lasting only a few weeks. Thus, the anodic coating protects the lipskin from corrosion during manufacture and setup procedure. However, anodizing does not afford any protection from corrosion due to in-operation environmental stresses.

In addition, damage to the lipskins that occurs during manufacture and set up also damages the anodic coating.

Both the erosion of the anodic coating and damage to it from handling during manufacture leave the lipskin unprotected and subject to corrosion. During operation, corrosion is accelerated as corrosion products are washed away by air, which exposes the unprotected lipskin to the corrosive environment.

Such corrosion damage in lipskins and on the leading edges of the wings, even if only on the surface, is unacceptable to commercial airlines because these parts are visible to passengers. Therefore, airlines often will refuse delivery of nose cowls or of nacelles with damaged lipskins and leading edges of wings or will accept these parts from the manufacturer only with a cosmetic concession.

It is known that thicker anodic coatings will offer better protection than thinner anodic coatings. However, increasing the thickness of anodic coatings has not proven feasible because increasing the thickness of the anodic coating leads to reduced fatigue life of the anodized part.

Paint based protection schemes have been tried but have proven to be unacceptable due to their lack of erosion resistance, corrosion resistance, thermal stability, and cosmetic repairability.

Chemical conversion coatings per MIL-C-5541 are often used to protect these aluminum alloys, especially to repair anodic coatings. These coatings provide good room temperature corrosion resistance but do not protect in high temperatures and do not match the color of the anodic coatings and are, therefore, cosmetically unacceptable.

The problems associated with wing leading edges and tail horizontal and vertical stabilizer leading edges are somewhat different than for lipskins. The wing and tail leading edges are formed of clad aluminum alloys which are not structural. These leading edges are physically abraded to remove visible residues of the rivet heads then polished to a bright luster. Such surfaces suffer the same cosmetic matching problems as lipskins; the polished surface, if damaged, cannot be touched up and must be repolished. Since polishing consumes the soft clad layer, eventually the bare basic alloy is exposed creating more cosmetic problems and corrosion.

In spite of these differences between lipskins and leading edges, both these surfaces suffer from cosmetic matching problems in manufacture and use; all are subject to deicing temperatures (232° C.) and the water droplet erosion environment described for lipskins. The basic coating requirements of the lipskins and leading edges are the same and all coatings and tests which are applicable to lipskins are applicable to leading edges, and vice versa.

Preferred characteristics of an ideal corrosion protection system for lipskins and leading edges include:

1) resistance to temperatures used in deicing, that is up to 190° C. (375° F.) on a routine basis and up to 232° C. (450° F.) on an occasional emergency basis,
2) resistance to high temperatures of 300° C. for 48 hours or 150° C. for 100 hours. Following the 150° C. exposure the coating must pass the cross-hatch adhesion test, ASTM D3359, method B (ISO 2409), and have a rating of "5" (no coating pickoff). In addition, the coating must withstand a direct impact test per ASTM D2792 at 1.38 kg-meters impact (120 inch-pounds),
3) resistance to low temperatures of −55° C. for one hour. The coating must show continued excellent adhesion as measured by the cross-hatch adhesion test, ASTM D3359, method B (ISO 2409), by having a rating of "5" —no pickoff— and also resistance to ASTM D2794 Direct Impact, passing the test at 1.38 kg-meters impact (120 inch-pounds),
4) resistance to corrosion as measured by the salt spray corrosion test, ASTM B117, and the filiform corrosion test, ISO 4623,
5) resistance to immersion in aircraft fluids, such as aviation fuel, lubricating oil, de-icing fluid, and distilled water,
6) resistance to erosion from high velocity water droplets as measured using a standardized test such as exposure to drops of a mean drop diameter of 2 mm, at an impact velocity of 223 meters/second, at an impact angle of 900, at an intensity of 25 mm/hour, for 10 minutes, and
7) repairability by touching up damaged areas, so that the repaired area is essentially indistinguishable by visual inspection from adjacent non-damaged areas, herein "cosmetic" repairability. Such a repair should be invisible to 20/20 naked eye observation from a distance of 3 meters.

When confronted with these stringent and cumulative requirements, it was not known whether a coating that would meet such requirements was available. A study of the various techniques described above unfortunately did not shed useful light on the solution of the problem.

Protective metal filled phosphate bonded coatings, including those that are chromium-containing, appeared at first to be satisfactory in many ways, it was disappointing to find out in further work that it did not meet the essential criteria of cosmetic repairability of the lipskin. Further search for a single layer coating that would meet all the above stated requirements was of no avail.

Generally, in the coating field, a single layer coating that meets all the requirements is preferred over a coating of multiple layers for numerous reasons, including possible lack of compatibility or adhesion of the coatings to each other, and other potential problems. Nonetheless, it appeared to be necessary to reconcile oneself to find a suitable second coat, or top coat that would meet the repairability requirement while being free of the problems often associated with a two-layered coating. Unexpectedly, it was found that an aluminum silicone paint admirably fulfilled all the necessary requirements of compatibility with the phosphate bonded basecoat and also provided repairability.

Subsequently, it was unexpectedly discovered that other first or basecoats could be used that met the set of requirements identified herein for a suitable basecoat and further that top coats other than the aluminum silicone paint also fulfill the necessary requirements of compatibility and repairability. These coatings are described hereinafter. As a result a two layered coating was perfected that fulfilled all the requirements for lipskin and leading edges of aircraft wings.

SUMMARY OF THE INVENTION

One embodiment of the invention is a two-layered coating which, when applied to a substrate of aerospace grade aluminum alloy, protects the substrate from corrosion due to environmental stress and which is physically and cosmetically repairable following mechanical damage. The coating is also aerodynamically restorable.

A second embodiment of the invention is a one-layered coating which, when applied to a substrate of aerospace grade aluminum alloy, protects the substrate from corrosion due to environmental stress and fulfills the several first requirements identified above.

The first layer of the coating is a phosphate bonded basecoat which is in direct contact with the coated part. The second layer of the coating is a topcoat. Following damage to the coating, such as by a scratch, the coating can be repaired so that it will be virtually indistinguishable from the physical-mechanical aspect from an undamaged coating and thus be restored cosmetically to its predamaged condition.

Another embodiment of the invention is an aerospace aluminum alloy part coated with the coating of the invention. The coated part may be anodized or non-anodized, clad or non-clad, and/or conversion coated or non-conversion coated. The coated parts are generally lipskins of nacelles and leading edges of wings and tails of aircraft, made of an aluminum alloy which is generally of the 2XXX series of aluminum alloys containing copper. Typical examples of such alloys include AA2024 (including AA2124 and AA2224) and AA2219 (including AA2419), although parts made of the other members of the 2XXX series, such as AA2011, AA2014, AA2017, AA2217, AA2218, AA2618, AA2025, and AA2036 can benefit from the coating of the invention. Any alloy that is suitable for use in the manufacture of leading edges of wings and tails and lipskins of nacelles is suitable for the coating of the invention.

In addition, aluminum alloy aircraft parts other than lipskins and leading edges may also benefit from the coatings of the invention. Suitable parts for the coating of the invention include anodized aluminum alloy parts which are subjected to environmental stress similar to that to which lipskins are exposed. These parts include aluminum parts within the nacelle. Aluminum alloy parts which are not subjected to these severe environmental stress are also suitable for the coating of the invention. Thus, the coated part may be of any portion of the aircraft and of any aluminum alloy.

A third embodiment of the invention is a method for applying the coating of the invention to an aerospace grade aluminum alloy part, especially a leading edge of a wing or tail or a lipskin made of an aluminum alloy of the 2XXX series.

In a desirable aspect of the process, the basecoat and/or the topcoat can be subjected to one or more burnishing steps, as with an orbital sander until smooth virtually "as new". Any rivet heads, or physical depressions due to these, that might have reappeared, are not apparent any longer.

Other embodiments will become apparent from the description herein.

DETAILED DESCRIPTION OF THE INVENTION

Figure 1:
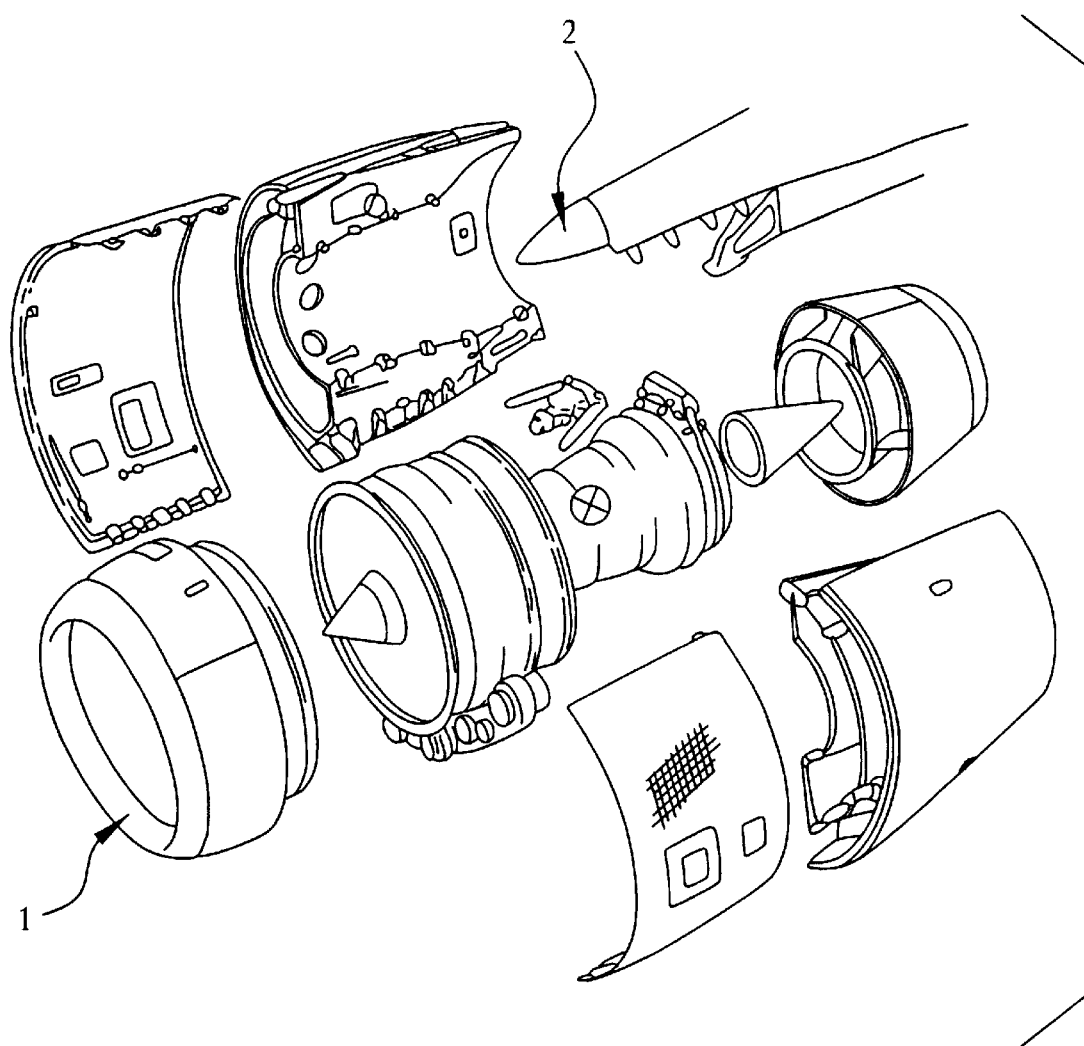
FIG. 1 shows diagrammatically the parts of a nacelle of a jet engine. 1 is the nose cowl of the nacelle, the forward part of which is the lipskin. 2 is the strut assembly to which the nacelle is attached.

The coating of the invention for lipskins and for leading edges of wings is a duplex coating of an aluminum/phosphate ceramic basecoat and a topcoat of a silicone paint with aluminum flake pigment. The composition of both the basecoat and the topcoat are capable of cure at temperatures below that at which the aluminum substrate of the lipskins or the leading edges will be adversely affected. Preferably, the curing temperature of the basecoat and the topcoat is at 190° C. (375° F.) or less.

The basecoat is preferably a phosphate bonded metal-filled basecoat, which may or may not contain chromium. Preferably, the basecoat contains aluminum.

The chromium-free basecoat of the coating of the invention may be any of the basecoats taught in patent application Ser. No. 08/364,786, filed Dec. 27, 1994, now U.S. Pat. No. 5,478,413, issued on Dec. 26, 1995, entitled ENVIRONMENTALLY FRIENDLY COATING COMPOSITIONS, which patent is incorporated herein by reference.

In a most preferred embodiment, the coating of the invention is a duplex coating in which the basecoat is a chromium-free environmentally friendly coating, and the topcoat is an aluminum silicone paint, as described below.

Alternatively, the basecoat may be a phosphate bonded metal-filled basecoat which contains chromium. Any one of coatings taught in prior U.S. Pat. Nos. 4,537,632 or 4,606,967, incorporated herein by reference, are suitable for use as the basecoat of the coating of the present invention. The coatings taught in these patents can be cured at a temperature of about 190° C. (375° F.). Additional suitable coating compositions of this type containing chromium and phosphate which are suitable as the basecoat of the coating of the present invention are described in U.S. Pat. Nos. 3,248,249; 3,248,250; 3,248,251 (Allen); 3,395,027; 3,869,293; 4,544,408; 4,548,646; 4,617,056; 4,650,699; 4,659,613; 4,683,157; 4,724,172; 4,806,161; 4,863,516; 4,889,558; 4,975,330; 5,066,540; 5,242,488; 5,279,649; 5,279,650; 4,319,924 and 4,381,323, each of which is incorporated herein by reference.

Preferably, the basecoat contains metallic aluminum pigment which permits cure at lower temperatures and increases the erosion protection capability of the coating. Optimally, the aluminum pigment is 3–4 μm average equivalent spherical diameter ($\overline{ESD}$) aluminum pigment. Alternatively, 5–6 μm atomized aluminum may be used. The aluminum pigment may be flake, leaf, or spheroid. For best results the basecoat may be burnished or, alternatively, may be left unburnished.

Additionally, the basecoat may contain one or more additives, which may be nitrogen containing compounds, such as amines, amides or imides, such as maleimide or succinimide. Suitable additives include di- and tri-ethanolamine compounds as taught in U.S. Pat. Nos. 4,319,924, and 4,381,323, or succinic acid or any dicarboxylic acid up to 14 carbon atoms, as taught in U.S. Pat. No. 3,990,920 which, by reducing hexavalent chromium to trivalent chromium, permit curing of the coating at lower temperatures than coatings not containing these or similar additives. Base coats containing these additives, however may be less ductible and may have inferior erosion protection than basecoats without the additives. Such additives which act by reducing chromium are not applicable to coatings of a composition taught in U.S. Pat. No. 5,478,413, which coatings lack chromium.

A suitable basecoat for the coating of the invention will preferably have the following characteristics.

1) An aqueous, acidic phosphate bonded metal filled composition, preferably having a pH of about 4.0 or less.
2) Can be thermally cured at temperatures of 190° C. (375° F.).
3) Is stable upon exposure to ultraviolet light.
4) Bonds strongly to the underlying substrate.
5) Has thermal resistance to long term repeated exposures to 230° C. (450° F.) and can withstand thermal excursions to temperatures above 260° C. (500° F.).

6) Resists corrosion from environmental exposure and thermal cycling.

7) Resists erosion from high velocity liquid and solid particles, including rain, sleet, hail and sand particles.

8) Is resistant to all fluids used on or around the aircraft.

The topcoat of the coating of the invention is preferably a resin based coating, most preferably being an aluminum silicone paint. Examples of suitable forms of silicone are as silicone, as a silicone alkyd, silicone epoxy, or as a silicone polyester. The resin of the topcoat of the invention is preferably stable when exposed to ultraviolet light and is stable when exposed to temperatures used in aircraft deicing.

High temperature resistant epoxies and other high temperature resins as well as non-resin based inorganic based topcoats are also suitable for the topcoat of the coating. Such topcoats must resist ultraviolet light degradation and rain droplet erosion. Tests disclosed herein may be utilized by one skilled in the art in selecting a suitable epoxy or non-resin inorganic based topcoat for use in the coating of the invention.

A suitable topcoat for the coating of the invention will preferably have the following characteristics.

1) Can be thermally cured at a temperature of 190° C. (375° F.) or less.

2) Is stable upon exposure to ultraviolet light.

3) Bonds strongly to the underlying basecoat.

4) Has thermal resistance. In a rain or ice storm exposure, the deicing system may heat the surface of the coated part to 400° (204° C.) or 450° F. (230° C.). Preferably, the coating should resist short term exposure to temperatures greater than 260° C. (500° F.).

5) Damaged areas can be readily repaired, with the repaired areas being essentially undetectable and having functionality equivalent to the coating applied originally.

Preferably, the topcoat will have a metallic, aluminum-like, color matching that of anodized aluminum, such as a pewter color, and should not fingerprint. The pewter color of the topcoat may be achieved by the use of aluminum or other metallic flake pigment. Brighter reflective finishes may be used but are less easily touched up cosmetically.

If an organic resin is used in the topcoat, the topcoat may be shiny and glossy, and highly reflective. High gloss surfaces are more difficult to touch up and produce an undetectable repair of a damaged area than is the case with duller surfaces. A non-leafing flake aluminum, which does not float to the surface of the coating and is formulated to be dull, may be used to reduce the gloss. Additionally, a flatting agent, such as silica ($SiO_2$) or PTFE powder or a clay additive, may be added to reduce gloss of the resin.

If an inorganic topcoat is used, the problem of gloss does not typically occur. Therefore, flatting agents are not needed to reduce gloss in inorganic topcoats. However, agents such as silica may be included in the inorganic topcoat to increase erosion life of the topcoat.

An example of a silicone-polyester based topcoat which is suitable for the coating of the invention comprises the following.

| Topcoat A: | |
|---|---|
| 1800 gm | Silicone-polyester resin |
| 1221 gm | Glycol ether solvents |
| 265 gm | n-Butanol |
| 79 gm | Xylene |
| 148 gm | Silicone resin |

| Topcoat A: | |
|---|---|
| 70 gm | Melamine formaldehyde resin |
| 409 gm | Non-leafing Aluminum flake, 75% paste |
| 39 gm | PTFE powder |
| 25 gm | Silica |
| 12 gm | Organophilic clay |
| 11 gm | Phosphate ester catalyst |
| 9 gm | Siloxane/organic acid defoamer |
| 8 gm | Silicone fluid |

An example of an epoxy resin based topcoat which is suitable for the coating of the invention comprises the following.

| Topcoat B: | | |
|---|---|---|
| Part A: | 1665 gm | Bisphenol A epoxy resin |
| | 666 gm | Diepoxide epoxy resin |
| | 4176 gm | Xylene |
| | 666 gm | Propylene glycol methyl ether acetate |
| | 1332 gm | Non-leafing aluminum flake paste |
| | 55 gm | PTFE powder |
| | 350 gm | Silica |
| Part B: | 3000 gm | Polyamine epoxy hardener |
| | 1940 gm | Xylene |

The topcoat is obtained by mixing 3 gm Part A to 1 gm Part B.

An example of an inorganic silicate based topcoat which is suitable for the coating of the invention comprises the following.

| Topcoat C: | |
|---|---|
| 2835 gm | Potassium silicate solution, 29% solids |
| 2025 gm | Deionized water |
| 3 gm | Nonionic surfactant |
| 506 gm | 40XD leafing aluminum flake, ultrafine |
| 1 gm | silicone based defoamer |

The above inorganic topcoat does not require high-heat curing, it is cured at ambient temperatures. Additionally, flatting agents are not required, and leafing aluminum flake may be used, because the inorganic topcoat is not glossy.

An additional example of an inorganic topcoat which is suitable for the coating of the invention may be formulated as follows.

| Topcoat D: | |
|---|---|
| 2000 gm | Deionized water |
| 675 gm | Phosphoric acid, 85% |
| 235 gm | Magnesium carbonate |
| 24 gm | Aluminum hydroxide |
| 21 gm | Zinc carbonate |
| 47 gm | Boric acid) |
| 25 gm | Phosphate ester surfactant |
| 240 gm | Non-leafing aluminum flake |
| 30 gm | Silica (optional) |

Alternatively, any of the bonding solutions of patent application Ser. No. 08/364,786, now U.S. Pat. No. 5,478,413, may be substituted in place of the above bonding solution as shown for Topcoat D.

The total thickness of the coating of the invention is preferably from about 25 to 250 μm (1 to 10 mils). The layers of the coating may be of equal thickness. If the layers are of equal thickness, each layer may be from about 12 μm (0.5 mils) to about 125 μm (5 mils), or any thickness in between, such as 12 to 25 or 50 μm (0.5–1.0 or 2.0 mils). Alternatively, the layers of the coating may be of different thicknesses. If the coating contains layers of different thicknesses, each layer may be between about 12 to 125 μm (0.5 to 5.0 mils) thick.

It is important to consider the functions of each layer of the coating when the specific coating process is described. Both basecoat and topcoat must resist the erosion, corrosion, and thermal cycling of the lipskin as wing/tail leading edge; however, certain areas will require thicker coatings due to more severe erosion exposure.

Only one layer of each of the basecoat and topcoat is required for the coating of the invention. If desired, more than one layer of either the basecoat or the topcoat, or of both, may be used.

Preferably, the topcoat layer of the coating is in contact with the basecoat layer of the coating. However, if desired, additional layers of paints or sealants may be used between the basecoat and topcoat layers.

Another embodiment of the invention is a method for applying the coating of the invention. Initially, the part to be coated is abraded to create a roughened profile surface for adhesion of the basecoat. Abrasion may be by any method known in the art, such as by sanding, sandblasting, or jitterbugging. The part is then cleaned of debris and degreased. Then, the basecoat is applied, dried, and cured. The topcoat is then applied to the dried and cured basecoat and is in turn dried and cured.

Preferably, the method of the invention for applying the coating of the invention is as follows.

The surface of the part to be coated is cleaned and degreased. If desired, the surface is then abrasive blasted or sanded to create a profile. The profile may be achieved by "jitterbugging", orbital sanding, or directional sanding.

The basecoat is applied to the cleaned and degreased surface by conventional means such as by painting, spraying, rolling, or airbrushing. The basecoat is allowed to dry and is cured at temperatures of 163–232° C. (325–450° F.). Higher cure temperatures may be used depending on the alloy and component. If desired, one or more additional layers of the basecoat may be applied to the layer of the basecoat which is in contact with the surface of the part.

Preferably, after curing, the basecoat is burnished to increase adhesion of the topcoat to the basecoat. Alternatively, the topcoat may be applied, as described below, to an unburnished basecoat.

The topcoat is applied to the dried, cured, and cooled basecoat by any of the means listed above for the basecoat. The topcoat is dried and is cured if required for the particular topcoat used. If desired, one or more additional layers of the topcoat may be applied to the layer of the topcoat in contact with the basecoat.

In the case of wing and tail leading edges, the process of applying the coating may differ. The substrate is often clad aluminum alloy which is polished after sanding the rivet heads smooth. Using the invention described herein, the rivet heads need not be sanded. The leading edge is abraded with aluminum oxide, then the phosphate bonded aluminum filled basecoat is applied and cured. The cured basecoat is sanded or burnished to cover any residual rivet head indications and the topcoat is applied and cured. Alternatively, a second basecoat is applied, then cured before the topcoat is applied.

Figure 2:
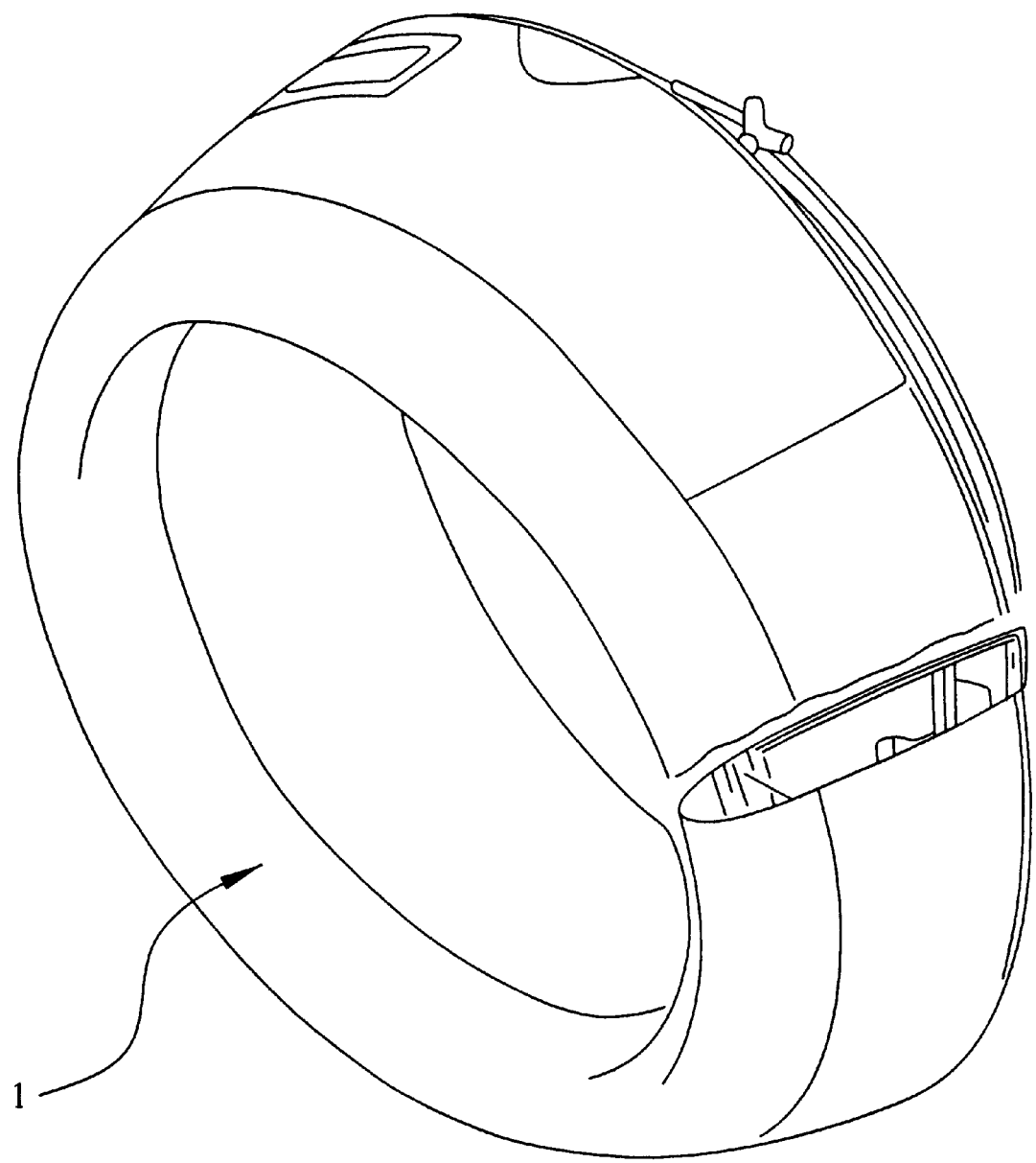
FIG. 2 shows diagrammatically the lipskin and the nose cowl 1 of a nacelle.

Another embodiment of the invention is an aerospace grade aluminum alloy part coated with the coating of the invention. In a preferred embodiment, the coated part of the invention is a lipskin of a nacelle (shown at 1 in FIGS. 1 and 2), which lipskin is preferably made of AA2219 aluminum alloy. Alternatively, the lipskin may be made of other heat resistant aluminum alloys.

In an alternative preferred embodiment, the coated part of the invention is the leading edge of an airplane wing (shown at 2 in FIG. 1), which edge is most preferably made of AA2024. The coated leading edge may be of aerospace grade aluminum alloys other than AA2024, which alloys may or may not be heat resistant. The aluminum alloy may or may not be clad with AA1100.

The coated part is coated with the coating of the invention by the method of the invention. The coated part is resistant to corrosion from high temperatures up to 260° C. (500° F.), from high salt environments, and to erosion from liquid and solid particles. The coated part is capable of being repaired physically by touching-up when the part is scratched or nicked so that the repaired area is essentially undetectable by touch and cosmetically upon unaided visual inspection at arms length distance (of about one meter).

Specimens coated in accordance with the invention were tested as follows to determine performance.

High Temperature Resistance
1) Exposure at 300° C. (572° F.) for 48 hours followed by a cross hatch adhesion test per ASTM D3359, Method B, with no coating loss or serious discoloration.
2) Exposure at 150° C. (302° F.) for 100 hours followed by a cross hatch adhesion test per ASTM D3359, Method B, with no coating loss or discoloration.

Low Temperature
1) Exposure to −55° C. (−67° F.) for 1 hour followed by a cross hatch adhesion test per ASTM D3359, Method B, with no coating loss.
2) Impact Resistance per ASTM D2794 Section 8.2.8 to exceed 100 inch-pounds.

Corrosion Resistance
1) Salt Spray tests per ASTM B117 for 3,000 hours on scribed "X" panels—no blistering, softening of corrosion.
2) Filiform Corrosion Test per ISO 4623:
   a) 24 hours in salt spray per ASTM B117 followed by 1,000 hours at 40±2° C. and 80±5% relative humidity.
   b) No filaments extending more than 2 mm from scribe lines (at 20–25° C.).

Fluid Immersion
1) Skydrol 500B (phosphate ester hydraulic fluid)—168 hours.
2) Aviation Fuel (Jet-8)—168 hours.
3) Lubricating Oil (MIL-L-7808), 168 hours.
4) Distilled Water—336 hours.
5) Deicing Fluid—168 hours. There was no softening of the coating film or adhesion loss when tested for pencil hardness per ASTM D3363 and cross-hatch adhesion per ASTM D3359.

Erosion Resistance
1) Falling Sand Erosion per ASTM D968—results exceed 125 liters of sand per 25 μm (1 mil) of coating thickness.
2) Rain Erosion Resistance—tested using a whirling arm apparatus at a velocity of 223 meters/sec, at a rate of 25 mm/hour, a mean drop diameter of 2 mm, an impact angle of 90° and a time of 10 minutes. Following the test all the basecoat was intact and topcoat was still covering 80% of the sample test area.

Repair of minor damage due to corrosion or scratching, such as might occur due to a scratch from a tool such as a screwdriver, is readily performed in the field by dressing and filling the damaged area with high temperature epoxy to restore the original profile, followed by touching-up with the topcoat or with an air cure/low temperature drying topcoat, such as an epoxy.

The topcoat in the repaired area adheres to the basecoat and the part as well as the topcoat in the nondamaged sections of the part, as determined by the cross hatch adhesion test.

If the damaged area is large, for example an area of 100×400 mm, such as might occur due to an extreme abrasion or scuffing, the coated part is repaired by sanding and feathering the damaged sections and applying a layer of the topcoat using an airbrush. The topcoat is dried and cured, preferably by the use of a locally applied heat source, such as a high intensity infra-red lamp for about 30 minutes. Smaller damaged areas, such as for example 10×40 mm can be touched up by sanding (or burnishing) the affected areas and adjacent areas A hand-guided orbital sander is a suitable device for such purpose.

If damage penetrates more than about 125–250 $\mu$m (0.005"–0.010") into the aluminum structure, the damaged area should be repaired first by applying an epoxy to restore the profile, followed by touching up with the basecoat and/or topcoat.

The following examples are illustrative of the invention and are not meant to limit the scope of the invention.

EXAMPLE 1

A lipskin of Alloy 2219 was cleaned and degreased and coated with a basecoat of the following composition:

| | |
|---|---|
| $CrO_3$ | 92 grams |
| $H_3PO_4$ | 323 grams |
| MgO | 72 grams |
| Water to 1 liter | |
| Helium atomized Aluminum powder, Spherical, 3.5 micron Average equivalent spherical diameter (Valimet H-3) | 800 grams |

The basecoat was cured at 260° C. (500° F.) for two hours. This basecoat may also be cured at 232° C. (450° F.) in six hours or at 190° C. (375° F.) in twenty hours. If a cure reducer, such as 0.5% succinimide is added, the basecoat will cure at 190° C. (375° F.) in one hour.

Following cure of the basecoat, a topcoat according to Topcoat A above, was applied.

The coated sample passed the following tests:

| | |
|---|---|
| salt spray (ASTM B117) | >5000 hours with no substrate corrosion |
| impact resistance (ASTM D2794) | 120 in. lbs. |
| heat exposure | 250° C. for 50 hours, no color change or loss of adhesion |
| cold exposure | −55° C. for one hour with no adhesion loss |

EXAMPLE 2

A lipskin of Alloy 2219 was cleaned and degreased and coated with the topcoat of Example 1 without a basecoat.

The coated part was tested for salt spray and impact resistance as in Example 1. Results of testing were as follows.

| | |
|---|---|
| salt spray (ASTM B117) | 350 hours - white corrosion products |
| impact resistance (ASTM D2794) | 60 in. lbs. |

When scratched and then repainted with the topcoat, the part felt like "new" to the touch and was undistinguishable visually from the undamaged area.

This Example demonstrates the superior protection of the duplex coating of the invention compared to a single layer coating having just the topcoat of the invention.

EXAMPLE 3

A wing leading edge 2.2 meters long of clad 2000 series aluminum alloy was processed as follows:

1. Solvent degreased.
2. Spray coated with 20–30 $\mu$m (dry film) of the basecoat of Example 1 and cured at 260° C. (500° F.) for 1.5 hours.
3. The roughness profile of the coating around the rivet heads was sanded with 80 mesh aluminum oxide paper. The basecoat was reapplied and cured as above.
4. The surface of the cured coating was "burnished" with an orbital sander having a 100 mesh aluminum oxide impregnated pad.
5. A layer of Topcoat A was applied and cured at 190° C. (375° F.) for 60 minutes. Topcoat thickness was 40–60 $\mu$m (1.6–2.4 mils) over the basecoat layer 45–65 $\mu$m (1.8–2.6 mils) thick.

This topcoat was also abraded with the orbital sander until smooth.

This coating met the high temperature, low temperature, corrosion resistance and erosion resistance requirements of Example 1.

EXAMPLE 4

A lipskin of Alloy 2219 was cleaned and degreased and coated with the duplex coating of Example 1. The sample coated part was damaged with a knife and a screw driver blade. The damaged area was sanded and feathered. A topcoat of the same composition as on the undamaged portion of the sample was spray applied to the damaged area and adjacent areas using an airbrush. The topcoat was allowed to dry and was cured under a high intensity infrared lamp for 30 minutes.

Following repair, the repaired area was indistinguishable from the adjacent non-damaged area by unaided visual inspection at a distance of one meter. It felt perfectly smooth to the touch. The repaired area showed resistance to greater than 100 double MEK rubs, indicating complete cure. Also, the cross hatch adhesion test to the repaired area and to nondamaged area showed no difference in adhesion of the topcoat to the underlying basecoat and metal part.

EXAMPLE 5

A leading edge of a tail assembly is cleaned and degreased, and coated with a chromate free aluminum filled phosphate basecoat as follows:

A coating is applied to the leading edge of the tail assembly as for the leading edge of the wing in Example 3 except that the basecoat is a chromate free aluminum filled phosphate basecoat prepared by making a composition formula of the following:

| | |
|---|---|
| 800 gm | Deionized water |
| 388 gm | Phosphoric acid, 85% |
| 17.5 gm | Zinc oxide |
| 10.3 gm | Ferric phosphate |
| 120 gm | Magnesium carbonate |
| 31 gm | Boric acid |

A basecoat of the following formula is prepared and applied.

| | |
|---|---|
| 200 ml | The above composition |
| 50 ml | Deionized water |
| 8 gm | Zinc aluminum phosphate |
| 120 gm | Aluminum powder, air atomized, 4.5 µm average particle size |

The basecoat is cured at 260° C. for three hours. Then,, a topcoat according to Topcoat D is applied.

EXAMPLE 6

A lipskin is coated with the basecoat of Example 1 and with a layer of Topcoat C.

EXAMPLE 7

A leading edge of a tail assembly is coated as in Example 3 with the basecoat of Example 3. A layer of topcoat A, but with $TiO_2$ pigment substituted for the aluminum flake, is applied.

EXAMPLE 8

A lipskin is coated with the basecoat of Example 5 and a layer of Topcoat C.

EXAMPLE 9

A leading edge of a wing is coated with the basecoat of Example 3 and a layer of Topcoat B.

EXAMPLE 10

A lipskin is coated in accordance with Example 6 except that 0.2 gm of succinimide was added to the basecoat composition. The basecoat is cured at 190° C. (375° F.) in one hour.

EXAMPLE 11

A lipskin is coated with the basecoat of Example 1. No topcoat is applied.

EXAMPLE 12

A leading edge of a wing is coated with the basecoat of Example 5. No topcoat is applied.

Each of the coatings of Examples 5–12 meet the high and low temperature, corrosion resistance, and erosion resistance requirements set forth above.

One skilled in the art can readily, with the benefit of the invention, make variations, substitutions and other changes to the above examples without departing from the spirit of the invention.

What is claimed is:

1. A multilayer coated aerospace grade aluminum-copper alloy part, said part coated with a coating comprising a phosphate bonded aluminum-filled basecoat and an aluminum silicone paint topcoat, wherein the coating prevents corrosion of the part due to environmental stresses of temperature of 190° C., high salt concentrations, and water droplet erosion, is resistant to deicing at a temperature of about 190° C., is resistant to a temperature of –55° C. for one hour, resistant to temperature of 150° C. for 100 hours, wherein the multi-layer coating is repairable when damaged, and wherein the repaired area is aerodynamically virtually indistinguishable from the physical point of view of the non-damaged area of the part.

2. The coated part of claim 1, wherein the part is selected from the group consisting of a lipskin of a nacelle and a leading edge of a wing or tail.

3. The coated part of claim 2 wherein the aluminum copper alloy is a 2XXX alloy.

4. The coated part of claim 3 wherein the 2XXX alloy is selected from the group consisting of AA2219 and AA2024.

5. The coated part of claim 4 wherein the alloy is AA2219.

6. The coated part of claim 1 wherein the basecoat is cured at a temperature of 190° C. or less.

7. The multilayer coating of claim 1 wherein the coating is also resistant to a temperature up to 232° C.

8. A multilayer coated part selected from the group consisting of a lipskin or a leading edge of a wing of an aircraft, the lipskin or leading edge comprising an aerospace aluminum-copper alloy, which is coated with a multilayer coating comprised of a basecoat of a phosphate bonded aluminum-filled coating and a topcoat of an aluminum silicone paint, which multilayer coating is resistant to deicing at a temperature of about 190° C., resistant to temperature of 150° C. for 100 hours, meets the cross-hatch ASTM D3359 adhesion test (method B (ISO 2409)), has a rating of "5" (no coating pickoff) in said adhesion test, withstands a direct impact test at 1.38 Kg meter impact measured by ASTM D2792, resistant to a temperature of –55° C. for one hour, resistant to corrosion as measured by the salt spray corrosion test, ASTM B117, after 3000 hours exposure to the salt spray test environment of ASTM B117 without substrate corrosion, and by the filiform corrosion test, ISO 4623, after 24 hours exposure to the salt spray test environment of ASTM B117, followed by 1,000 hours exposure to 80±5% relative humidity at 40±2° C., with no filaments extending more than 2 mm from scribe lines at 20–25° C., resistant to erosion from high velocity water droplets as measured by exposure to water drop of a mean drop diameter of 2 mm, at an impact velocity of 223 meters/second, at an impact angle of 90°, at an intensity of 25 mm/hour for 10 minutes, and a damaged area of the multilayer coating being repairable so as to be virtually undistinguishable from an adjacent non-damaged area.

9. The coated part of claim 8 wherein the aerospace aluminum-copper alloy is a 2XXX alloy.

10. The coated part of claim 8 in which the basecoat is also free of chromium.

11. The coated part of claim 8, wherein the aluminum-copper alloy further comprises metal selected from the group consisting of magnesium, manganese, titanium, vanadium, and zirconium.

12. The coated part of claim 11, wherein the metal is zirconium.

13. The coated part of claim 8 in which the basecoat also comprises chromium.

14. A multilayer coated aerospace grade aluminum alloy part, said part is coated with a coating comprising a phosphate bonded metal-filled basecoat and an aluminum silicone paint topcoat, wherein the coating prevents corrosion of the part due to environmental stresses of temperature of 190° C., high salt concentrations, and water droplet erosion, is resistant to deicing at a temperature of about 190° C., is resistant to a temperature of −55° C. for one hour, is resistant to a temperature of 150° C. for 100 hours, wherein the multi-layer coating is repairable when damaged, and wherein the repaired area is aerodynamically virtually indistinguishable from the physical point of view of the non-damaged area of the part.

15. The coated part of claim 14 wherein the base coat is cured at a temperature of 190° C. or less.

* * * * *